E. OSGOOD.
Cotton Gin.
No. 20,216.  Patented May 11, 1858.
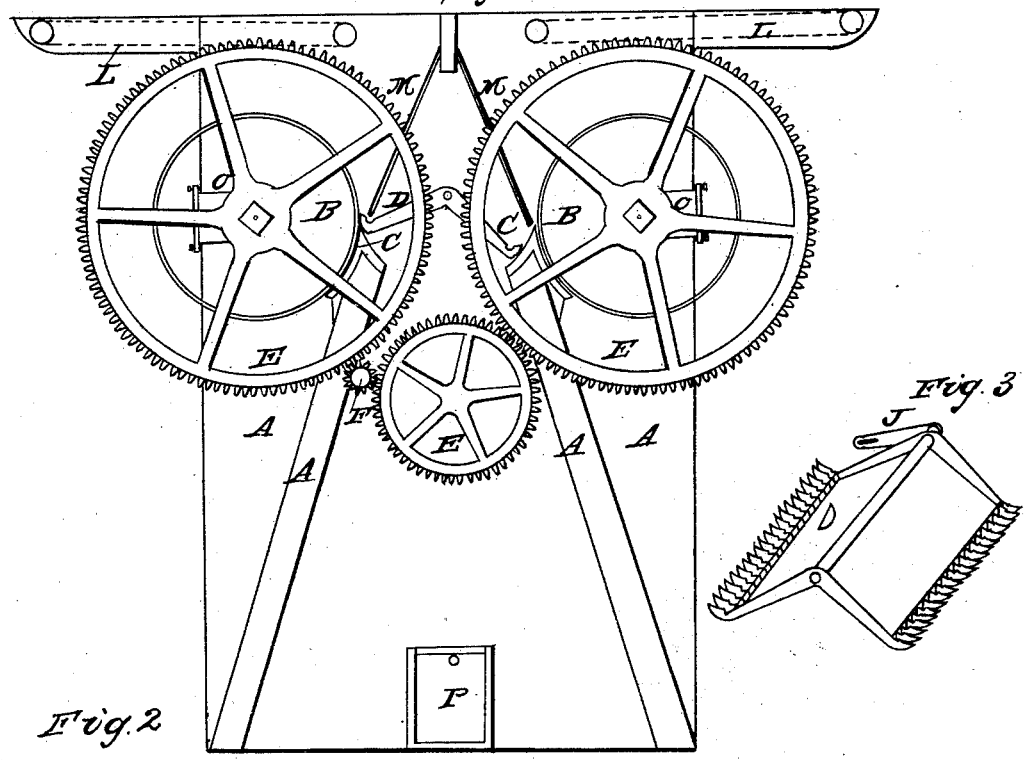
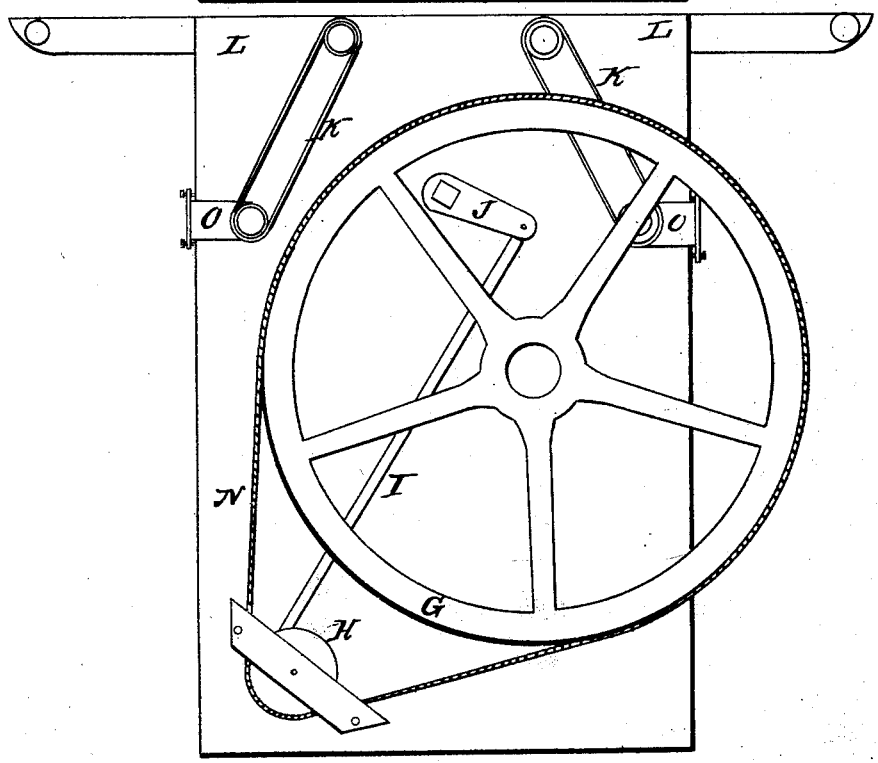

UNITED STATES PATENT OFFICE.

ENOCH OSGOOD, OF BOSTON, MASSACHUSETTS.

IMPROVEMENT IN COTTON-GINS.

Specification forming part of Letters Patent No. 20,216, dated May 11, 1858.

*To all whom it may concern:*

Be it known that I, ENOCH OSGOOD, of Boston, in the county of Suffolk and State of Massachusetts, have invented a new and useful Improvement in a Cotton-Gin; and I do hereby declare that the following is a full, clear, and exact description of the construction and operation of the same, reference being had to the annexed drawings, making a part of this specification, in which—

Figure 1 is a diagram illustrating my invention; Fig. 2, a side elevation; Fig. 3, a perspective view of the oscillating clearer D, to be hereinafter described.

The machine exhibited in the drawings is what may be termed a "double" machine, or containing a duplication of my invention.

The dotted red lines A A A indicate the frame-work and the box or receptacle for the seeds and dirt or extraneous matters that may be discharged from the cotton.

B B are two cylinders or drums, each being covered with smooth or perforated leather, and arranged so as to run close against or very near to one of two curved or concave and smooth or polished plates or guards, C C, each having a sectional form, as exhibited in Fig. 1, the two outer surfaces of said guards meeting together at an angle, as shown in the drawings. Each of the guards C operates in connection with an oscillating clearer, D, which consists of a frame provided with a series of teeth (or the equivalent thereof) in manner as shown in Fig. 3, and also in Fig. 1, such teeth being made to extend or play between the guard C and an inclined rack or grid, M, arranged with respect to the oscillating clearer, as shown in Fig. 1. The guards or plates C C are to be arranged so near to their respective drums B B as to cause such drums, while revolving, to take or draw the fibers of cotton through the spaces between them and the guards. Each clearer D works close against the inner curved surface of the guard C, and by having an oscillating or reciprocating motion imparted to it it is made to alternately enter and depart from the mass of cotton which may be in the space over it and between the rack M and the cylinder B, and lighten up and loosen the fibers, in order that they may be drawn away from the seeds. Furthermore, this motion insures the fall of the seeds and dirt between the arms of the clearer and into the box or receptacle below the clearer D, while the ginned cotton will be delivered outside of the box.

P denotes the door of the box or seed-receptacle. E E E are gears for operating the two cylinders B B, they being put in motion by a pinion, F, on the end of a driving-shaft, which carries a pulley or wheel, G, around which and a crank-pulley, H, an endless belt, N, works. From such crank-pulley a connecting-rod, *i*, extends to an arm, J, which projects from the shaft of the oscillating clearer D, the same being exhibited in Fig. 3. By such means the said clearer receives its vibratory motion.

Over each cylinder B is an endless feeding-apron, L, on which the cotton is placed, and is delivered to the action of the drum B, the guard C, and the clearer D. These endless aprons are operated by endless bands K K or any suitable mechanism.

In the machine above described the double clearer D is vibrated toward one cylinder and away from the other at one and the same time.

In the operation of this machine the cotton with the seeds and dirt in it is laid upon the endless apron *l*, and by such is deposited upon the inclined rack M, or in the space between the same and the adjacent cylinder B, and by such cylinder, the double concave or guard C, and the clearer D it will be separated from its seeds and extraneous matters, substantially as above described.

I claim—

The combination of the oscillating clearer D and the concave guard or plate C, constructed, arranged with the cylinder B and the rack M, and made to operate therewith, substantially in manner as and for the purpose as hereinbefore specified.

ENOCH OSGOOD.

Witnesses:
CHAS. L. ALEXANDER,
PETER BERGMAN.